(12) United States Patent
Dong et al.

(10) Patent No.: US 11,184,227 B2
(45) Date of Patent: Nov. 23, 2021

(54) METHOD AND APPARATUS FOR UPDATING CONFIGURATION OBJECT (71) Applicant: BEIJING BAIDU NETCOM SCIENCE AND TECHNOLOGY CO., LTD., Beijing (CN)

(72) Inventors: Xuanchen Dong, Beijing (CN); Leding Li, Beijing (CN); Danfeng Lu, Beijing (CN); Mengtao Wang, Beijing (CN)

(73) Assignee: Beijing Baidu Netcom Science and Technology Co., Ltd., Beijing (CN)

( * ) Notice: Subject to any disclaimer, the term of this patent is extended or adjusted under 35 U.S.C. 154(b) by 223 days.

(21) Appl. No.: 16/352,470

(22) Filed: Mar. 13, 2019

(65) Prior Publication Data

US 2019/0372840 A1 Dec. 5, 2019

(30) Foreign Application Priority Data

May 31, 2018 (CN) .......................... 201810551435.3

(51) Int. Cl.
*H04L 12/24* (2006.01)
*H04L 29/08* (2006.01)

(52) U.S. Cl.
CPC .......... *H04L 41/0813* (2013.01); *H04L 67/34* (2013.01)

(58) Field of Classification Search
None
See application file for complete search history.

(56) References Cited

U.S. PATENT DOCUMENTS

| 7,383,534 B1* | 6/2008 | Agbabian | G06F 8/71 717/108 |
| 2005/0021622 A1* | 1/2005 | Cullen | H04L 45/00 709/204 |
| 2006/0050862 A1* | 3/2006 | Shen | H04Q 3/0062 379/219 |
| 2006/0143716 A1* | 6/2006 | Ikemoto | G06F 21/57 726/27 |

(Continued)

FOREIGN PATENT DOCUMENTS

| CN | 101170557 A | 4/2008 |
| CN | 107547239 A | 1/2018 |
| CN | 108089874 A | 5/2018 |

*Primary Examiner* — Mohamed Ibrahim
(74) *Attorney, Agent, or Firm* — Knobbe, Martens, Olson & Bear, LLP (57) ABSTRACT

Some embodiments of the present disclosure relate to a method and apparatus for updating a configuration object. An implementation of the method includes: acquiring an update configuration file; determining a to-be-updated configuration object based on the update configuration file and a pre-stored historical configuration file; determining whether the to-be-updated configuration object is processing information; and updating, in response to determining that the to-be-updated configuration object is processing information, the to-be-updated configuration object based on the update configuration file when any one of the following conditions is met: the information is processed, a preset duration has elapsed since acquiring the update configuration file. In some embodiments, buffer time can be provided before updating the configuration object, and the configuration object can be updated without the user's perception.

14 Claims, 6 Drawing Sheets

(56) References Cited

U.S. PATENT DOCUMENTS

| | | | |
|---|---|---|---|
| 2006/0168614 A1* | 7/2006 | Salas | H04N 21/4627 |
| | | | 725/23 |
| 2008/0103854 A1 | 5/2008 | Adam | |
| 2013/0125107 A1* | 5/2013 | Bandakka | G06F 11/1448 |
| | | | 717/171 |
| 2015/0212944 A1* | 7/2015 | Chen | G06F 12/0862 |
| | | | 711/137 |
| 2018/0332117 A1* | 11/2018 | Street | H04L 41/0846 |

* cited by examiner

METHOD AND APPARATUS FOR UPDATING CONFIGURATION OBJECT

CROSS-REFERENCE TO RELATED APPLICATIONS

This application claims priority to Chinese Patent Application No. 201810551435.3, filed with the China National Intellectual Property Administration (CNIPA) on May 31, 2018, the content of which is incorporated herein by reference in its entirety.

TECHNICAL FIELD

Embodiments of the present disclosure relate to the field of Internet of Things technology, specifically to a method and apparatus for updating a configuration object.

BACKGROUND

In the future wireless communication system, the number of smart devices flooding into wireless networks may increase exponentially. Whether it is a smart city, smart home, intelligent logistics, telemedicine, etc., it will join the era of the Internet of Everything, that is, the Internet of Things (IoT). This is bound to generate a large amount of data. In a traditional solution, the massive data generated at the devices needs to be uploaded to a cloud server for calculation, which causes problems such as long response delay and high bandwidth cost. In the existing technology, the above problems may be solved by a solution of an edge computing device being combined with the Internet of Things.

Serving as a bridge between devices connected to the IoT and the remote cloud server, the edge computing device may meet the needs such as data optimization, security, and privacy protection.

SUMMARY

Embodiments of the present disclosure provide a method and apparatus for updating a configuration object.

In a first aspect, the embodiments of the present disclosure provide a method for updating a configuration object, including: acquiring an update configuration file; determining a to-be-updated configuration object based on the update configuration file and a pre-stored historical configuration file; determining whether the to-be-updated configuration object is processing information; and updating, in response to determining that the to-be-updated configuration object is processing information, the to-be-updated configuration object based on the update configuration file when any one of the following conditions is met: the information is processed, a preset duration has elapsed since the update configuration file being acquired.

In some embodiments, the acquiring an update configuration file includes: receiving an update configuration instruction; deserializing the update configuration instruction to determine a download address of the update configuration file; and downloading the update configuration file from the download address.

In some embodiments, the update configuration file includes an update device permission list; and the method further includes: determining whether the update device permission list includes an identifier of a currently connected device; and disconnecting a current connection, in response to determining that the update device permission list does not include the identifier of the currently connected device.

In some embodiments, the method further includes: receiving a request from a device, the request including a message publishing request or a message subscription request; determining whether a configuration object processing the request is being updated; and processing, in response to determining that the configuration object processing the request is being updated, the request after the configuration object processing the request is updated.

In some embodiments, the update device permission list includes publishing topic information corresponding to the identifier of the device; and the method further includes: receiving, in response to determining that the update device permission list includes the identifier of the currently connected device, a message publishing request from the currently connected device, the message publishing request including a message content and a message topic; determining whether the message topic matches the publishing topic information; and publishing, in response to determining that the message topic matches the publishing topic information, the message topic and the message content.

In some embodiments, the update configuration file includes an update message forwarding information list, and update message forwarding information in the update message forwarding information list includes a target topic and one of following: a destination topic, and a destination configuration object; and the method further includes: creating a target configuration object based on the update message forwarding information list, where when determining that the published message topic is the same as the target topic, the target configuration object forwards the published message content to any one of the following: a queue for storing messages of the destination topic, and a queue for storing messages of the destination configuration object.

In a second aspect, the embodiments of the present disclosure provide an apparatus for updating a configuration object, including: an update configuration file acquisition unit, configured to acquire an update configuration file; a configuration object determination unit, configured to determine a to-be-updated configuration object based on the update configuration file and a pre stored historical configuration file; a first state determination unit, configured to determine whether the to-be-updated configuration object is processing information; and a configuration object updating unit, configured to update, in response to determining that the to-be-updated configuration object is processing information, the to-be-updated configuration object based on the update configuration file when any one of the following conditions is met: the information is processed, a preset duration has elapsed since the update configuration file being acquired.

In some embodiments, the update configuration file acquisition unit includes: a configuration instruction receiving module, configured to receive an update configuration instruction; a deserialization module, configured to deserialize the update configuration instruction to determine a download address of the update configuration file; and an update configuration file downloading module, configured to download the update configuration file from the download address.

In some embodiments, the update configuration file includes an update device permission list; and the apparatus further includes: a connection permission verification unit, configured to determine whether the update device permission list comprises an identifier of a currently connected device; and a connection disconnecting unit, configured to disconnect a current connection, in response to determining that the update device permission list does not include the identifier of the currently connected device.

In some embodiments, the apparatus further includes: a first request receiving unit, configured to receive a request from a device, the request including a message publishing request or a message subscription request; a second state determination unit, configured to determine whether a configuration object processing the request is being updated; and a request processing unit, configured to process, in response to determining that the configuration object processing the request is being updated, the request after the configuration object processing the request is updated.

In some embodiments, the update device permission list includes publishing topic information corresponding to the identifier of the device; and the apparatus further includes: a second request receiving unit, configured to receive, in response to determining that the update device permission list includes the identifier of the currently connected device, a message publishing request from the currently connected device, the message publishing request including a message content and a message topic; a message topic determination unit, configured to determine whether the message topic matches the publishing topic information; and a message publishing unit, configured to publish, in response to determining that the message topic matches the publishing topic information, the message topic and the message content.

In some embodiments, the update configuration file includes an update message forwarding information list, and update message forwarding information in the update message forwarding information list includes a target topic and one of the following: a destination topic, and a destination configuration object; and the apparatus further includes: a target configuration object creating unit, configured to create a target configuration object based on the update message forwarding information list, where when determining that the published message topic is the same as the target topic, the target configuration object forwards the published message content to any one of the following: a queue for storing messages of the destination topic, and a queue for storing messages of the destination configuration object.

In a third aspect, the embodiments of the present disclosure provide an edge computing device, including: one or more processors; and a storage apparatus, storing one or more programs thereon, and the one or more programs, when executed by the one or more processors, cause the one or more processors to implement the method as described in any one of the embodiments in the first aspect.

In a fourth aspect, the embodiments of the present disclosure provide a computer readable medium, storing a computer program thereon, the computer program, when executed by a processor, implements the method as described in any one of the embodiments in the first aspect.

The method and apparatus for updating a configuration object provided by the embodiments of the present disclosure, after acquiring an update configuration file, may determine a to-be-updated configuration object based on the acquired update configuration file and a pre-stored historical configuration file, then may determine whether the to-be-updated configuration object is processing information, and update, in response to determining that the to-be-updated configuration object is processing information, the to-be-updated configuration object based on the update configuration file when any one of the following conditions is met: the information is processed, a preset duration has elapsed since the update configuration file being acquired. The method and apparatus of the present disclosure provide buffer time before updating the configuration object, and updates the configuration object without the user's perception.

BRIEF DESCRIPTION OF THE DRAWINGS

After reading detailed descriptions of non-limiting embodiments with reference to the following accompanying drawings, other features, objectives and advantages of the present disclosure will become more apparent.

DETAILED DESCRIPTION OF EMBODIMENTS

The present disclosure will be further described below in detail in combination with the accompanying drawings and the embodiments. It may be appreciated that the specific embodiments described herein are merely used for explaining the relevant disclosure, rather than limiting the disclosure. In addition, it should be noted that, for the convenience of description, only the parts related to the relevant disclosure are shown in the accompanying drawings.

It should be noted that the embodiments in the present disclosure and the features in the embodiments may be combined with each other on a non-conflict basis. The present disclosure will be described below in detail with reference to the accompanying drawings and in combination with the embodiments.

Figure 1:
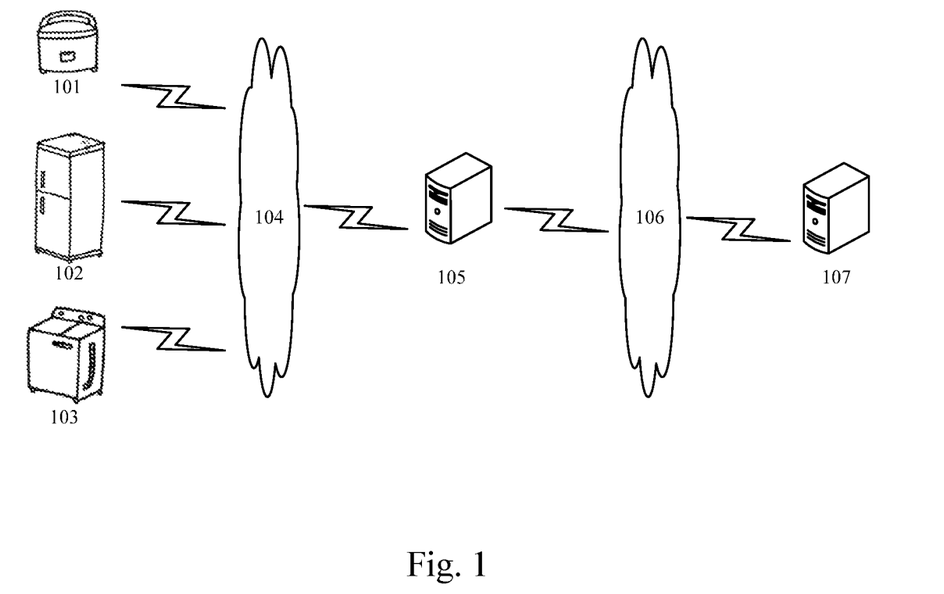
FIG. 1 is a system architecture diagram to which an embodiment of the present disclosure may be applied.

FIG. 1 illustrates a system architecture 100 to which a method for updating a configuration object or an apparatus for updating a configuration object of the embodiments of the present disclosure may be applied.

As shown in FIG. 1, the system architecture 100 may include devices 101, 102, 103, networks 104, 106, an edge computing device 105, and a cloud server 107. The network 104 is configured to provide a communication link medium between the devices 101, 102, 103 and the edge computing device 105, and the network 106 is configured to provide a communication link medium between the edge computing device 105 and the cloud server 107. The networks 104, 106 may include various connection types of, such as wired, wireless communication links, or optical fibers.

The devices 101, 102, 103 may interact with the edge computing device 105 through the network 104 to receive or send messages and the like. Various sensors may be installed on the devices 101, 102, 103, and the data measured by the sensors may be sent to the edge computing device 105. For example, the device 101 is a rice cooker on which a temperature sensor may be installed, it may send the temperature of the food contained therein to the edge computing device 105. For example, a timer may be installed on the washing machine 103, and the laundry time may be sent to the edge computing device 105.

The devices 101, 102, 103 may be hardware or software. When the devices 101, 102, 103 are hardware, they may be various electronic devices with sensors including, but not limited to, rice cookers, air conditioners, refrigerators, washing machines, smart TVs, smart lights, smart sockets, and the like. When the devices 101, 102, 103 are software, they may be installed in the above-listed electronic devices. It may be implemented as a plurality of software or software modules (e.g., for providing distributed services) or as a single software or software module, which is not specifically limited in the present disclosure.

The edge computing device 105 may be an electronic device that provides various services in the Internet of Things, such as an electronic device that provides computing services to information sent by the devices 101, 102, and 103. The edge computing device 105 may perform processing such as analyzing on the received data (for example, temperature information sent by the rice cooker), and feed back the processing result (control to continue heating or keeping warm) to the device.

The edge computing device 105 may be hardware or software. When the edge computing device 105 is hardware, it may be various electronic devices having data processing functions, including but not limited to smart phones, tablets, laptop portable computers, desktop computers and the like. When the edge computing device 105 is software, it may be installed in the above-listed electronic devices. It may be implemented as a plurality of software or software modules (e.g., for providing distributed services) or as a single software or software module, which is not specifically limited in the present disclosure.

The server 107 may be a cloud server that provides cloud services in the Internet of Things. For example, a server that issues an update configuration command to the edge computing device 105. The cloud server may also acquire hardware information of the edge computing device 105 and issue data to the edge computing device based on the hardware information.

The server 107 may be hardware or software. When the server 107 is hardware, it may be various electronic devices having data processing functions, including but not limited to smart phones, tablets, laptop portable computers, desktop computers and the like. When the server 107 is software, it may be installed in the above-listed electronic devices. It may be implemented as a plurality of software or software modules (e.g., for providing distributed services) or as a single software or software module, which is not specifically limited in the present disclosure.

It should be noted that the method for updating a configuration object provided by the embodiments of the present disclosure is generally executed by the edge computing device 105, and accordingly, the apparatus for updating a configuration object is generally provided in the edge computing device 105.

It should be understood that the number of devices, networks, edge computing devices, and servers in FIG. 1 is merely illustrative. Depending on the implementation needs, there may be any number of devices, networks, edge computing devices and servers.

Figure 2:
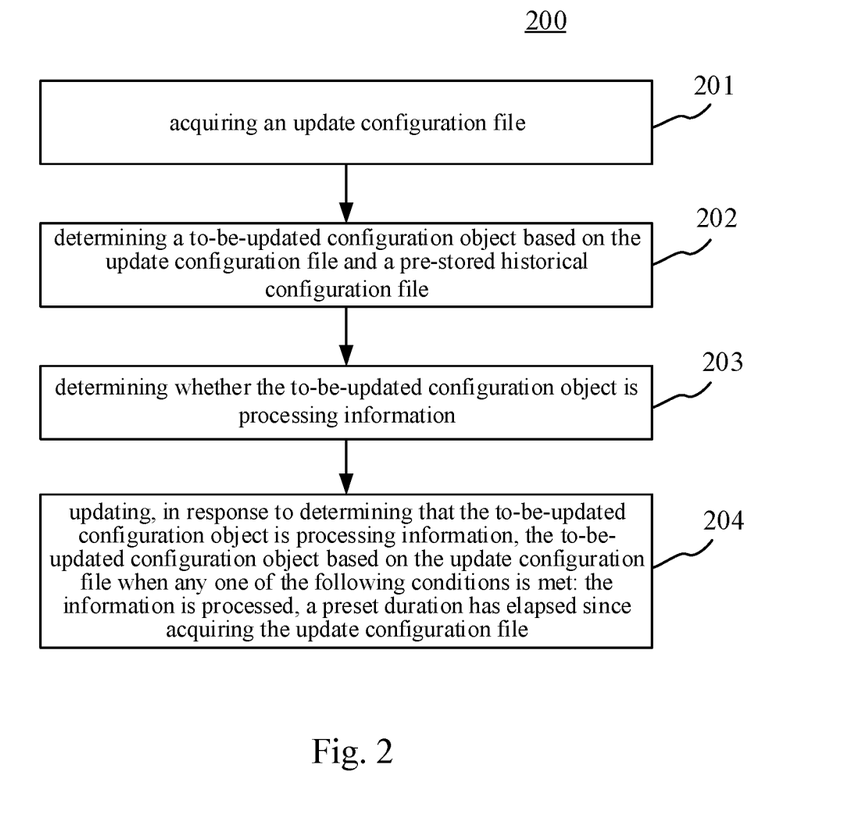
FIG. 2 is a flowchart of an embodiment of a method for updating a configuration object according to the present disclosure.

With further reference to FIG. 2, a flow 200 of an embodiment of a method for updating a configuration object according to the present disclosure is illustrated. The method for updating a configuration object of the present embodiment includes the following steps:

Step 201, acquiring an update configuration file.

In the present embodiment, an executing body of the method for updating a configuration object (for example, the edge computing device 105 as shown in FIG. 1) may acquire an update configuration file through a wired connection or a wireless connection. The update configuration file may include data that updates a configuration object in the edge computing device. For example, the update configuration file may include data that updates a configuration object for processing information sent by the device (such as the devices 101, 102, 103 as shown in FIG. 1). The data may include device connection permission information, a function calculation model, and the like. In the present embodiment, the configuration object refers to a specific instance in the executing body for processing information (in the programming language, the object is an instance of a class). For example, the executing body may include a configuration object for forwarding a message, a configuration object for calculating the content in the message, and the like.

In the present embodiment, the executing body may acquire the above update configuration file in a plurality of methods. For example, the executing body may acquire from a cloud server of the Internet of Things, or acquire from a separate server for the update configuration file, or may acquire the update configuration file by running a command line parameter.

It should be noted that the above wireless connection may include but is not limited to 3G/4G connection, WiFi connection, Bluetooth connection, WiMAX connection, Zigbee connection, UWB (ultra wideband) connection, and other wireless connections that are now known or to-be-developed in the future.

Step 202, determining a to-be-updated configuration object based on the update configuration file and a pre-stored historical configuration file.

In the present embodiment, the executing body may locally pre-store a historical configuration file. The current configuration data of the executing body is obtained from the historical configuration file. The update configuration file may be a configuration file that differs from the historical configuration file.

The executing body may compare the update configuration file with the historical configuration file to determine a difference content between the two. For the difference content, the executing body may determine, in combination with the content processed by the current configuration object, a configuration object for processing the difference content in the current configuration. For example, compared with the historical configuration file, the update configuration file deletes one function calculation model, and the executing body may look up in the existing configuration object set for the configuration object which performs calculation through this function calculation model. The found configuration object is the to-be-updated configuration object.

It may be understood that the to-be-updated configuration object may include a to-be-added configuration object, a to-be-deleted configuration object, and a to-be-changed configuration object. When compared with the historical configuration file, the update configuration file is added a content, the executing body detects whether the current configuration object may process the added content. If not, the executing body may parse the added content and then create a configuration object which is for processing the added content. When compared with the historical configuration file, the update configuration file is deleted a content, the executing body may delete the configuration object which is for processing the deleted content. When compared with the historical configuration file, the update configuration file changes a content, the executing body may update the configuration object which is for processing the changed content.

Step 203, determining whether the to-be-updated configuration object is processing information.

After determining the to-be-updated configuration object, the executing body may determine whether the to-be-updated configuration object is processing information. Generally, after receiving the information, the object processes the received information by calling a function. That is, the object implements the processing of the information by running the called function. The executing body may acquire the state of the object, and if it is in the code running state, it means the object is processing information. Or, the object may generate a return value after the processing of the information is completed. When a return value is not received, it may be determined that the configuration object is processing information. Therefore, the executing body may determine whether the return value of the to-be-updated configuration object is received to determine whether the to-be-updated configuration object is processing information. For example, the to-be-updated configuration object is computing a certain piece of information, or is forwarding a certain message, or is publishing a certain message.

Step 204, updating, in response to determining that the to-be-updated configuration object is processing information, the to-be-updated configuration object based on the update configuration file when any one of the following conditions is met: the information is processed, a preset duration has elapsed since the update configuration file being acquired.

The executing body may enter a waiting state when determining that the to-be-updated configuration object is processing information, so that the to-be-updated configuration object continues to process the information. The executing body may determine in real time whether the following conditions are met after acquiring the update configuration file: the information is processed, a preset duration has elapsed since the update configuration file being acquired. When the processing of the information requires a long time, the to-be-updated configuration object may be updated when the preset duration has elapsed since the update configuration file being acquired, so as to improve the update efficiency of the configuration object.

When it is determined that any one of the above conditions is met, the executing body may update the to-be-updated configuration object based on the update configuration file. When updating the configuration object, the to-be-updated configuration object may be closed first, and then the to-be-updated configuration object is initialized. Then, a new configuration object may be created, configuration objects that are not in the original update configuration file may be deleted, and the original configuration object may be updated.

It may be understood that when it is determined that the to-be-updated configuration object is not processing information, the executing body may directly update the to-be-updated configuration object based on the update configuration file.

In some alternative implementations of the present embodiment, after the update of the configuration object is completed, the executing body may store the update configuration file as the historical configuration file for later update of the configuration object.

Figure 3:
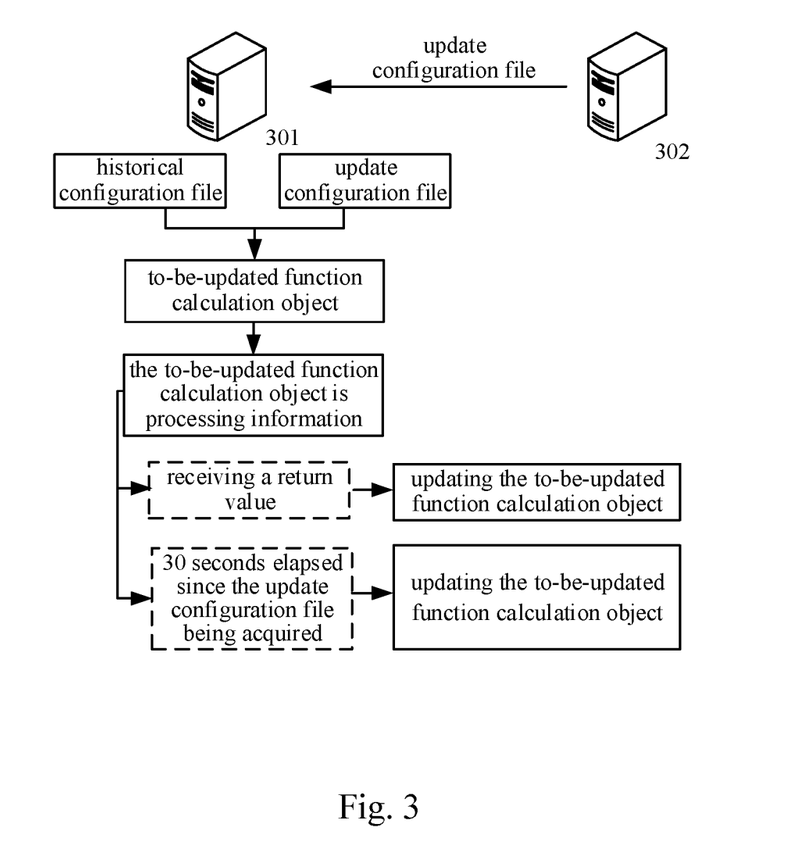
FIG. 3 is a schematic diagram of an application scenario of the method for updating a configuration object according to an embodiment of the present disclosure.

With further reference to FIG. 3, FIG. 3 is a schematic diagram of an application scenario of the method for updating a configuration object according to the present embodiment. In the application scenario of FIG. 3, the edge computing device 301 acquires an update configuration file from the cloud server 302. The edge computing device 301 compares the update configuration file with a locally pre-stored historical configuration file, and determines that a function calculation object in the historical configuration file is deleted from the update configuration file. The deleted function calculation object is the to-be-updated function calculation object. The function calculation object may perform calculation on the temperature information sent by an air conditioner connected to the edge computing device 301. The edge computing device 301 does not receive a return value of the function calculation object, and determines that the function calculation object is currently performing calculation on the temperature information, and enters a waiting state. After receiving the return value of the function calculation object, the edge computing device determines that the function calculation object completes information processing. If it has elapsed 30 seconds since the edge computing device 301 acquired the above update configuration file and a return value has not been received, the edge computing device controls the function calculation object to terminate the calculation processing. The function calculation object is then updated based on the update configuration file.

The method for updating a configuration object provided by the above embodiments of the present disclosure may determine, after acquiring an update configuration file, a to-be-updated configuration object based on the acquired update configuration file and a pre-stored historical configuration file; then may determine whether the to-be-updated configuration object is processing information; and in response to determining that the to-be-updated configuration object is processing information, update the to-be-updated configuration object based on the update configuration file when any one of the following conditions is met: the information is processed, a preset duration has elapsed since the update configuration file being acquired. The method of the present embodiment provides buffer time before updating the configuration object, and the user experience is not affected.

In some alternative implementations of the present embodiment, the step 201 may include the following steps not shown in FIG. 2: first, receiving an update configuration instruction; then, deserializing the update configuration instruction to determine a download address of the update configuration file; and finally downloading the update configuration file from the download address.

In this implementation, the executing body may first receive an update configuration instruction from the cloud server. The update configuration instruction may be a sequence of bytes including the download address of the update configuration file. After receiving the update configuration instruction, the executing body may perform a deserialization operation on the update configuration instruction to obtain the download address therein. The executing body may download the update configuration file from the download address.

In the method of this implementation, the update configuration file may be placed on a remote file server, and the executing body may download the update configuration file through the Hypertext Transfer Protocol (HTTP), which may effectively improve the download speed.

In some alternative implementations of the present embodiment, the method may further include the following steps not shown in FIG. 2: receiving a request from a device, the request including a message publishing request or a message subscription request; determining whether a configuration object processing the request is being updated; and processing, in response to determining that the configuration object processing the request is being updated, the request after the configuration object processing the request is updated.

In the method of this implementation, during the updating of the configuration object of the executing body, the request sent by the device may still be received, and the request may include a message publishing request and a message subscription request. The message publishing request is for requesting to publish messages of certain topics, and the message subscription request is for requesting to subscribe to messages of certain topics. Upon receiving the above request, the executing body may determine whether the configuration object used to process the request is being updated. It may be understood that the configuration object may be updated by running code. Therefore, the executing body may determine whether the configuration object is being updated by detecting the state of the configuration object. If it is being updated, the request is processed after the update of the configuration object is completed.

In the method of this implementation, the request from the device may still be received during the updating of the configuration object and the request is processed after the update is completed. In other words, during the updating of the configuration object, the service will not be stopped, which improves the user experience.

In some alternative implementations of the present embodiment, the method may further include the following steps not shown in FIG. 2: sending its own hardware information to the cloud server; and receiving the function calculation model returned by the cloud server.

The above function calculation model is determined in combination with the hardware information of the edge computing device by the cloud server after determining the hardware resources required by each function calculation model in the preset function calculation model set. The function calculation model may be various functions for processing information sent by the device, which may be trained and obtained by the machine learning algorithm. For example, the function calculation model may be a trained neural network, the neural network may calculate the received temperature information to determine whether it is necessary to continue to heat up and an increased temperature value. The cloud server may first determine the hardware resources required by each function calculation model in the preset function calculation model set. Then, in conjunction with the current hardware information of the edge computing device, the cloud server may determine how many function calculation models the edge computing device can run and which function calculation models the edge computing device can run. The cloud server may send the determined function calculation models to the edge computing device after determining the function calculation models. For example, the memory capacity of the edge computing device is 1G, the function calculation model A needs 300 M memory at runtime, and the function calculation model B needs 500 M memory at runtime, then the cloud server may send the function calculation model A and the function calculation model B to the edge computing device.

It may be understood that the cloud server may be in communication connection with a plurality of edge computing devices. The function calculation models running in each edge computing device may be the same or different. The edge computing device may create a configuration object that uses the above function calculation model for data processing, to implement processing of the data sent by the device.

Figure 4:
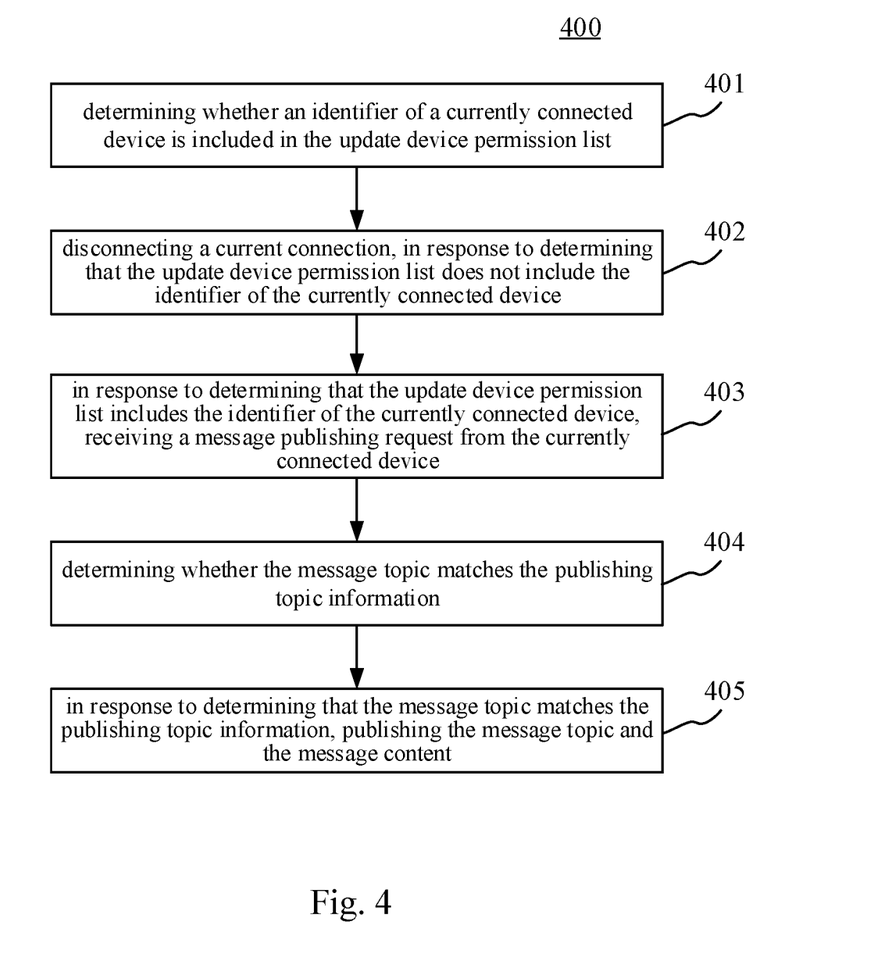
FIG. 4 is a flowchart of another embodiment of the method for updating a configuration object according to the present disclosure.

With further reference to FIG. 4, a flow 400 of another embodiment of the method for updating a configuration object according to the present disclosure is illustrated. In the present embodiment, the update configuration file may include an update device permission list, and the list may include an identifier of a device that can access the executing body. The list may also include publishing topic information corresponding to the identifier of the device. The publishing topic information may include the topic of the message that the device indicated by the identifier is capable of publishing. As shown in FIG. 4, the method for updating a configuration object of the present embodiment may further include the following steps:

Step 401, determining whether the update device permission list includes an identifier of a currently connected device.

In the present embodiment, the executing body may determine whether the identifier of a device currently connected to the executing body is included in the update device permission list included in the update configuration file. If not, it indicates that the device currently connected to the executing body no longer has the permission to connect to the executing body, and then step 402 is performed. If included, it indicates that the device currently connected to the executing body still has the permission to connect to the executing body, and then step 403 is performed.

Step 402, disconnecting a current connection, in response to determining that the update device permission list does not include the identifier of the currently connected device.

If the executing body determines that the update device permission list does not include the identifier of the currently connected device, it may be determined that the connection between the currently connected device and the executing body is illegal, and the executing body may disconnect the connection with the currently connected device.

Step 403, receiving, in response to determining that the update device permission list includes the identifier of the currently connected device, a message publishing request from the currently connected device.

If the executing body determines that the update device permission list includes the identifier of the currently connected device, it may be determined that the connection between the currently connected device and the executing body is still legal. Then, the executing body may receive a message publishing request from the currently connected device through a monitoring port. The executing body may support a variety of communication protocols, including but not limited to MQTT (Message Queuing Telemetry Transport) protocol, TCP (Transmission Control Protocol), SSL (Secure Sockets Layer), and the like. In the communication process, there are three identities in the MQTT protocol: a publisher, an agent, and a subscriber. The publisher and the subscriber of a message may both be devices, and the message agent may be the executing body (edge computing device) of the present embodiment. The message publisher may be the message subscriber at the same time. Messages transmitted by the MQTT may include two parts: a topic and a payload. The topic may be understood as the type of a message, and after the subscriber subscribes to messages of the topic, it receives the message content for the topic. The payload may be understood as the content of a message, which refers to the content that the subscriber specifically uses. In the present embodiment, the message publishing request may include a message topic and a message content.

Step 404, determining whether the message topic matches the publishing topic information.

After receiving the message publishing request, the executing body may determine whether the message topic in the message publishing request matches the publishing topic information. The matching here means that the publishing topic information includes the message topic. If it matches, step 405 is performed.

Step 405, publishing, in response to determining that the message topic matches the publishing topic information, the message topic and the message content.

If the executing body determines that the message topic matches the publishing topic information, the message topic and the message content may be published.

The method for updating a configuration object provided by the above embodiments of the present disclosure may maintain the connection of the device that is still legal and valid in the update configuration file, and avoid the phenomenon that the current update causes the device to reconnect. After receiving the message publishing request of the device, it is determined based on the update configuration file whether the device has a publishing permission, the connected device may be effectively controlled.

In some alternative implementations of the present embodiment, the update configuration file may include an update message forwarding information list, and message forwarding information in the list may include a target topic and one of the following: a destination topic, and a destination configuration object. The destination topic is used to match with the message topic published by the device. The destination topic refers to a topic that may receive the message content, and the destination configuration object refers to a configuration object that may receive the message content. For example, the target topic may be the temperature published by the air conditioner, the destination topic may be the humidity published by the humidifier, and the destination configuration object may be a function object for calculating the temperature control.

The method may further include the following steps not shown in FIG. 4: creating a target configuration object based on the update message forwarding information list. In this implementation, the executing body may create a target configuration object based on the update message forwarding information list. The created target configuration object may forward the published message content to a queue for storing messages of the destination topic or forward to a queue for storing messages of the destination configuration object, when determining that the target topic is the same as a message topic published by the device.

In the method of this implementation, the message may be forwarded to different topics and configuration objects at the same time, which enriches the forwarding method of the message and improves the forwarding efficiency of the message.

Figure 5:
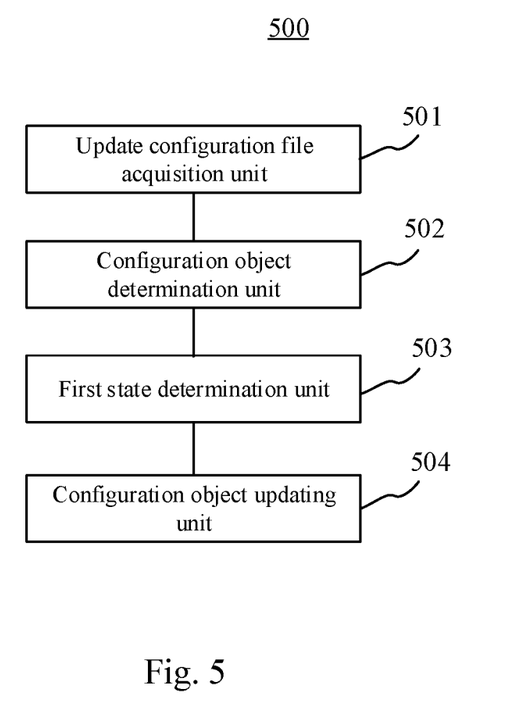
FIG. 5 is a schematic structural diagram of an embodiment of an apparatus for updating a configuration object according to the present disclosure.

With further reference to FIG. 5, as an implementation of the method shown in the above figures, the present disclosure provides an embodiment of an apparatus for updating a configuration object, and the apparatus embodiment corresponds to the method embodiment as shown in FIG. 2, and the apparatus may be specifically applied to various electronic devices.

As shown in FIG. 5, the apparatus 500 for updating a configuration object of the present embodiment includes: an update configuration file acquisition unit 501, a configuration object determination unit 502, a first state determination unit 503 and a configuration object updating unit 504.

Here, the update configuration file acquisition unit 501 is configured to acquire an update configuration file.

The configuration object determination unit 502 is configured to determine a to-be-updated configuration object based on the update configuration file and a pre-stored historical configuration file.

The first state determination unit 503 is configured to determine whether the to-be-updated configuration object is processing information.

The configuration object updating unit 504 is configured to update, in response to determining that the to-be-updated configuration object is processing information, the to-be-updated configuration object based on the update configuration file when any one of the following conditions is met: the information is processed, a preset duration has elapsed since the update configuration file being acquired.

In some alternative implementations of the present embodiment, the update configuration file acquisition unit 501 may further include a configuration instruction receiving module, a deserialization module and an update configuration file downloading module not shown in FIG. 5.

Here, the configuration instruction receiving module is configured to receive an update configuration instruction.

The deserialization module is configured to deserialize the update configuration instruction to determine a download address of the update configuration file.

The update configuration file downloading module is configured to download the update configuration file from the download address.

In some alternative implementations of the present embodiment, the update configuration file includes an update device permission list. The apparatus 500 may further include a connection permission verification unit and a connection disconnecting unit not shown in FIG. 5.

The connection permission verification unit is configured to determine whether the update device permission list comprises an identifier of a currently connected device.

The connection disconnecting unit is configured to disconnect a current connection, in response to determining that the update device permission list does not include the identifier of the currently connected device.

In some alternative implementations of the present embodiment, the apparatus 500 may further include a first request receiving unit, a second state determination unit and a request processing unit not shown in FIG. 5.

The first request receiving unit is configured to receive a request from a device. The request includes a message publishing request or a message subscription request.

The second state determination unit is configured to determine whether a configuration object processing the request is being updated.

The request processing unit is configured to process, in response to determining that the configuration object processing the request is being updated, the request after the configuration object processing the request is updated.

In some alternative implementations of the present embodiment, the update device permission list includes publishing topic information corresponding to the identifier of the device. The apparatus 500 may further include a second request receiving unit, a message topic determination unit and a message publishing unit not shown in FIG. 5.

The second request receiving unit is configured to receive, in response to determining that the update device permission list includes the identifier of the currently connected device, a message publishing request from the currently connected device. The message publishing request includes a message content and a message topic.

The message topic determination unit is configured to determine whether the message topic matches the publishing topic information.

The message publishing unit is configured to publish, in response to determining that the message topic matches the publishing topic information, the message topic and the message content.

In some alternative implementations of the present embodiment, the update configuration file includes an update message forwarding information list, and update message forwarding information in the update message forwarding information list includes a target topic and one of the following: a destination topic, and a destination configuration object. The apparatus 500 may further include a target configuration object creating unit not shown in FIG. 5, configured to create a target configuration object based on the update message forwarding information list, where when determining that the published message topic is same as the target topic, the target configuration object forwards the published message content to any one of the following: a queue for storing messages of the destination topic, and a queue for storing messages of the destination configuration object.

The apparatus for updating a configuration object provided by the above embodiment of the present disclosure, after acquiring an update configuration file, may determine a to-be-updated configuration object based on the acquired update configuration file and a pre-stored historical configuration file, then may determine whether the to-be-updated configuration object is processing information, and update, in response to determining that the to-be-updated configuration object is processing information, the to-be-updated configuration object based on the update configuration file when any one of the following conditions is met: the information is processed, a preset duration has elapsed since the update configuration file being acquired. The method and apparatus of the present embodiment provide buffer time before updating the configuration object, and update the configuration object without the user's perception.

It should be understood that the units 501 to 504 described in the apparatus 500 for updating a configuration object respectively correspond to the respective steps in the method described with reference to FIG. 2. Thus, the operations and features described above for the method for updating a configuration object are equally applicable to the apparatus 500 and the units contained therein, and detailed descriptions thereof will be omitted.

Figure 6:
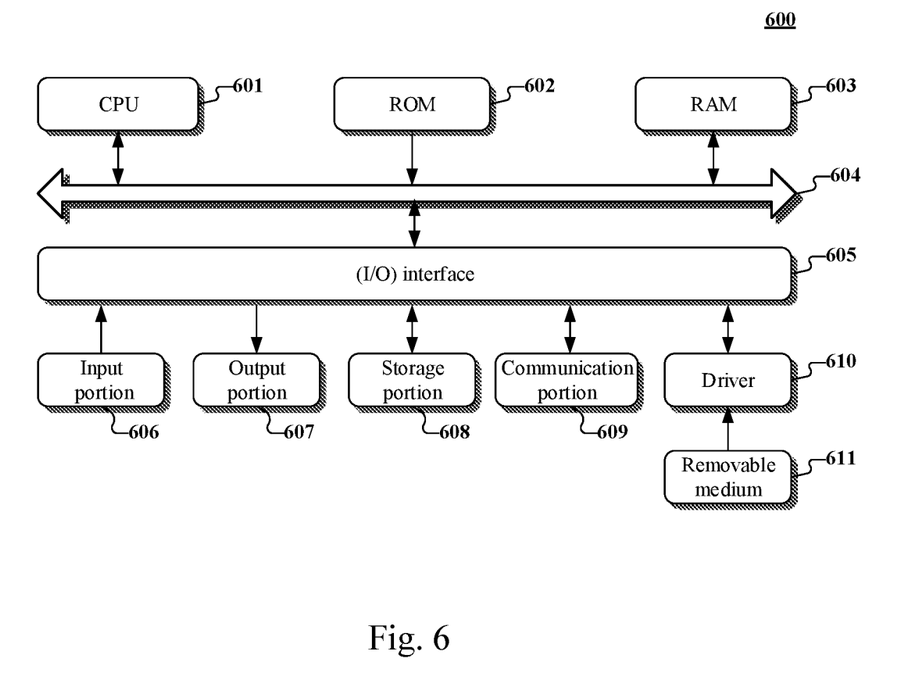
FIG. 6 is a schematic structural diagram of a computer system adapted to implement an edge computing device of the embodiments of the present disclosure.

With further reference to FIG. 6, a schematic structural diagram of a computer system 600 adapted to implement the edge computing device of the embodiments of the present disclosure is shown. The edge computing device shown in FIG. 6 is merely an example, and should not limit the function and scope of use of the embodiments of the present disclosure.

As shown in FIG. 6, the computer system 600 includes a central processing unit (CPU) 601, which may execute various appropriate actions and processes in accordance with a program stored in a read-only memory (ROM) 602 or a program loaded into a random access memory (RAM) 603 from a storage portion 608. The RAM 603 also stores various programs and data required by operations of the system 600. The CPU 601, the ROM 602 and the RAM 603 are connected to each other through a bus 604. An input/output (I/O) interface 605 is also connected to the bus 604.

The following components are connected to the I/O interface 605: an input portion 606 including a keyboard, a mouse, etc.; an output portion 607 including such as a cathode ray tube (CRT), a liquid crystal display device (LCD), a speaker, etc.; a storage portion 608 including a hard disk and the like; and a communication portion 609 including a network interface card, such as a LAN card and a modem. The communication portion 609 performs communication processes via a network, such as the Internet. A driver 610 is also connected to the I/O interface 605 as required. A removable medium 611, such as a magnetic disk, an optical disk, a magneto-optical disk, and a semiconductor memory, may be installed on the driver 610, to facilitate the retrieval of a computer program from the removable medium 611, and the installation thereof on the storage portion 608 as needed.

In particular, according to the embodiments of the present disclosure, the process described above with reference to the flow chart may be implemented in a computer software program. For example, an embodiment of the present disclosure includes a computer program product, which includes a computer program that is tangibly embedded in a computer-readable medium. The computer program includes program codes for performing the method as illustrated in the flow chart. In such an embodiment, the computer program may be downloaded and installed from a network via the communication portion 609, and/or may be installed from the removable medium 611. The computer program, when executed by the central processing unit (CPU) 601, implements the above mentioned functionalities as defined by the method of some embodiments of the present disclosure.

It should be noted that the computer readable medium in some embodiments of the present disclosure may be computer readable signal medium or computer readable storage medium or any combination of the above two. An example of the computer readable storage medium may include, but not limited to: electric, magnetic, optical, electromagnetic, infrared, or semiconductor systems, apparatus, elements, or a combination of any of the above. A more specific example of the computer readable medium may include but is not limited to: electrical connection with one or more wire, a portable computer disk, a hard disk, a random access memory (RAM), a read only memory (ROM), an erasable programmable read only memory (EPROM or flash memory), a fiber, a portable compact disk read only memory (CD-ROM), an optical memory, a magnet memory or any suitable combination of the above.

In some embodiments of the present disclosure, the computer storage medium may be any physical medium containing or storing programs which may be used by a command execution system, apparatus or element or incorporated thereto. In some embodiments of the present disclosure, the computer readable signal medium may include data signal in the base band or propagating as parts of a carrier, in which computer readable program codes are carried. The propagating data signal may take various forms, including but not limited to: an electromagnetic signal, an optical signal or any suitable combination of the above. The signal medium that can be read by computer may be any computer readable medium except for the computer readable storage medium. The computer readable medium is capable of transmitting, propagating or transferring programs for use by, or used in combination with, a command execution system, apparatus or element. The program codes contained on the computer readable medium may be transmitted with any suitable medium including but not limited to: wireless, wired, optical cable, RF medium etc., or any suitable combination of the above.

A computer program code for performing operations in some embodiments of the present disclosure may be compiled using one or more programming languages or combinations thereof. The programming languages include object-oriented programming languages, such as Java, Smalltalk or C++, and also include conventional procedural programming languages, such as "C" language or similar programming languages. The program code may be completely executed on a user's computer, partially executed on a user's computer, executed as a separate software package, partially executed on a user's computer and partially executed on a remote computer, or completely executed on a remote computer or server. In the circumstance involving a remote computer, the remote computer may be connected to a user's computer through any network, including local area network (LAN) or wide area network (WAN), or may be connected to an external computer (for example, connected through Internet using an Internet service provider).

The flow charts and block diagrams in the accompanying drawings illustrate architectures, functions and operations that may be implemented according to the systems, methods and computer program products of the various embodiments of the present disclosure. In this regard, each of the blocks in the flow charts or block diagrams may represent a module, a program segment, or a code portion, said module, program segment, or code portion including one or more executable instructions for implementing specified logic functions. It should also be noted that, in some alternative implementations, the functions denoted by the blocks may occur in a sequence different from the sequences shown in the accompanying drawings. For example, any two blocks presented in succession may be executed, substantially in parallel, or they may sometimes be in a reverse sequence, depending on the function involved. It should also be noted that each block in the block diagrams and/or flow charts as well as a combination of blocks may be implemented using a dedicated hardware-based system performing specified functions or operations, or by a combination of a dedicated hardware and computer instructions.

The units involved in the embodiments of the present disclosure may be implemented by means of software or hardware. The described units may also be provided in a processor, for example, described as: a processor, including an update configuration file acquisition unit, a configuration object determination unit, a first state determination unit and a configuration object updating unit. Here, the names of these units do not in some cases constitute a limitation to such units themselves. For example, the update configuration file acquisition unit may also be described as "a unit for acquiring an update configuration file."

In another aspect, the present disclosure further provides a computer readable medium. The computer readable medium may be included in the apparatus in the above described embodiments, or a stand-alone computer readable medium not assembled into the apparatus. The computer readable medium stores one or more programs. The one or more programs, when executed by the apparatus, cause the apparatus to: acquire an update configuration file; determine a to-be-updated configuration object based on the update configuration file and a pre-stored historical configuration file; determine whether the to-be-updated configuration object is processing information; and update, in response to determining that the to-be-updated configuration object is processing information, the to-be-updated configuration object based on the update configuration file when any one of the following conditions is met: the information is processed, a preset duration has elapsed since the update configuration file being acquired.

The above description only provides an explanation of the preferred embodiments of the present disclosure and the technical principles used. It should be appreciated by those skilled in the art that the inventive scope of the present disclosure is not limited to the technical solutions formed by the particular combinations of the above-described technical features. The inventive scope should also cover other technical solutions formed by any combinations of the above-described technical features or equivalent features thereof without departing from the concept of the present disclosure. Technical schemes formed by the above-described features being interchanged with, but not limited to, technical features with similar functions disclosed in the present disclosure are examples.

What is claimed is:

1. A method for updating a configuration object, applied to an edge computing device, wherein the configuration object comprises an instance for processing information in the edge computing device, and the method comprises:
   acquiring an update configuration file;
   determining a to-be-updated configuration object based on the update configuration file and a pre-stored historical configuration file;
   determining whether the to-be-updated configuration object is processing information; and
   updating, in response to determining that the to-be-updated configuration object is processing a piece of information, the to-be-updated configuration object based on the update configuration file in response to any one of following conditions being met: the processing on the piece of information is completed or a preset duration has elapsed since the update configuration file being acquired,
   wherein the method further comprises:
   sending hardware information of the edge computing device to a cloud server; and
   receiving a function calculation model returned by the cloud server, wherein the function calculation model is adopted by the configuration object for processing information,
   wherein the method is performed by at least one hardware processor.

2. The method according to claim 1, wherein the update configuration file comprises an update device permission list; and
   the method further comprises:
   determining whether the update device permission list comprises an identifier of a currently connected device; and
   disconnecting a current connection, in response to determining that the update device permission list does not comprise the identifier of the currently connected device.

3. The method according to claim 2, wherein the update device permission list comprises publishing topic information corresponding to the identifier of the device; and
   the method further comprises:
   receiving, in response to determining that the update device permission list comprises the identifier of the currently connected device, a message publishing request from the currently connected device, the message publishing request comprising a message content and a message topic;
determining whether the message topic matches the publishing topic information; and
publishing, in response to determining that the message topic matches the publishing topic information, the message topic and the message content.

4. The method according to claim 3, wherein the update configuration file comprises an update message forwarding information list, and update message forwarding information in the update message forwarding information list comprises a target topic and one of following: a destination topic or a destination configuration object; and
the method further comprises:
creating a target configuration object based on the update message forwarding information list, wherein in response to determining that the published message topic is same as the target topic, the target configuration object forwards the published message content to any one of following: a queue for storing messages of the destination topic, and a queue for storing messages of the destination configuration object.

5. The method according to claim 1, wherein the acquiring an update configuration file comprises:
receiving an update configuration instruction;
deserializing the update configuration instruction to determine a download address of the update configuration file; and
downloading the update configuration file from the download address.

6. The method according to claim 1, wherein the method further comprises:
receiving a request from a device, the request comprising at least one of a message publishing request or a message subscription request;
determining whether a configuration object processing the request is being updated; and
processing, in response to determining that the configuration object processing the request is being updated, the request after the configuration object processing the request is updated.

7. The method according to claim 1, wherein the configuration object is an instance of a class.

8. An apparatus for updating a configuration object, wherein the configuration object comprises an instance for processing information in an edge computing device, and the apparatus comprises:
at least one processor; and
a memory storing instructions, the instructions when executed by the at least one processor, cause the at least one processor to perform operations, the operations comprising:
acquiring an update configuration file;
determining a to-be-updated configuration object based on the update configuration file and a pre-stored historical configuration file;
determining whether the to-be-updated configuration object is processing information; and
updating, in response to determining that the to-be-updated configuration object is processing a piece of information, the to-be-updated configuration object based on the update configuration file in response to any one of following conditions being met: the processing the piece of information is completed or a preset duration has elapsed since the update configuration file being acquired,
wherein the operations further comprise:
sending hardware information of the edge computing device to a cloud server; and
receiving a function calculation model returned by the cloud server, wherein the function calculation model is adopted by the configuration object for processing information.

9. The apparatus according to claim 8, wherein the update configuration file comprises an update device permission list; and
the operations further comprise:
determining whether the update device permission list comprises an identifier of a currently connected device; and
disconnecting a current connection, in response to determining that the update device permission list does not comprise the identifier of the currently connected device.

10. The apparatus according to claim 9, wherein the update device permission list comprises publishing topic information corresponding to the identifier of the device; and
the operations further comprise:
receiving, in response to determining that the update device permission list comprises the identifier of the currently connected device, a message publishing request from the currently connected device, the message publishing request comprising a message content and a message topic;
determining whether the message topic matches the publishing topic information;
and publishing, in response to determining that the message topic matches the publishing topic information, the message topic and the message content.

11. The apparatus according to claim 10, wherein the update configuration file comprises an update message forwarding information list, and update message forwarding information in the update message forwarding information list comprises a target topic and one of following: a destination topic, or a destination configuration object; and
the operations further comprise:
creating a target configuration object based on the update message forwarding information list, wherein in response to determining that the published message topic is same as the target topic, the target configuration object forwards the published message content to any one of following: a queue for storing messages of the destination topic or a queue for storing messages of the destination configuration object.

12. The apparatus according to claim 8, wherein the acquiring an update configuration file comprises:
receiving an update configuration instruction;
deserializing the update configuration instruction to determine a download address of the update configuration file; and
downloading the update configuration file from the download address.

13. The apparatus according to claim 8, wherein the operations further comprise:
receiving a request from a device, the request comprising at least one of a message publishing request or a message subscription request;
determining whether a configuration object processing the request is being updated; and processing, in response to determining that the configuration object processing the request is being updated, the request after the configuration object processing the request is updated.

14. A non-transitory computer readable medium, storing a computer program thereon, the computer program, when executed by a processor, causes the processor to perform operations for updating a configuration object, wherein the configuration object comprises an instance for processing information in an edge computing device, and the operations comprise:

acquiring an update configuration file;

determining a to-be-updated configuration object based on the update configuration file and a pre-stored historical configuration file;

determining whether the to-be-updated configuration object is processing information; and updating, in response to determining that the to-be-updated configuration object is processing information, the to-be-updated configuration object based on the update configuration file in response to any one of following conditions being met: the information is processed or a preset duration has elapsed since the update configuration file being acquired, wherein the method further comprises:

sending hardware information of the edge computing device to a cloud server; and receiving a function calculation model returned by the cloud server, wherein the function calculation model is adopted by the configuration object for processing information.

* * * * *